United States Patent
Nanda et al.

(10) Patent No.: US 9,230,111 B1
(45) Date of Patent: Jan. 5, 2016

(54) SYSTEMS AND METHODS FOR PROTECTING DOCUMENT FILES FROM MACRO THREATS

(71) Applicant: Symantec Corporation, Mountain View, CA (US)

(72) Inventors: Susanta Nanda, Los Angeles, CA (US); Sandeep Bhatkar, Sunnyvale, CA (US); Fanglu Guo, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/073,507

(22) Filed: Nov. 6, 2013

Related U.S. Application Data

(60) Provisional application No. 61/839,363, filed on Jun. 25, 2013.

(51) Int. Cl.
*G06F 21/56* (2013.01)
*G06F 12/14* (2006.01)
*G06F 21/57* (2013.01)

(52) U.S. Cl.
CPC .............. *G06F 21/57* (2013.01); *G06F 21/562* (2013.01); *G06F 21/563* (2013.01)

(58) Field of Classification Search
CPC .............................. G06F 21/562; G06F 21/563
USPC ....................................................... 726/22–24
See application file for complete search history.

(56) References Cited

U.S. PATENT DOCUMENTS

| | | | |
|---|---|---|---|
| 6,901,519 B1 * | 5/2005 | Stewart et al. ................... 726/24 |
| 7,487,540 B2 * | 2/2009 | Shipp .............................. 726/22 |
| 7,490,244 B1 * | 2/2009 | Kennedy et al. .............. 713/188 |
| 7,788,699 B2 * | 8/2010 | Largman et al. ................... 726/1 |
| 7,797,743 B2 * | 9/2010 | Treacy et al. .................... 726/22 |
| 7,861,296 B2 * | 12/2010 | Costea et al. .................... 726/22 |
| 8,060,577 B1 | 11/2011 | Conrad |
| 8,769,687 B2 * | 7/2014 | Hoefelmeyer et al. ......... 726/23 |
| 8,839,420 B2 * | 9/2014 | Wibbeler ........................ 726/22 |
| 9,118,715 B2 | 8/2015 | Staniford et al. |
| 2001/0005889 A1 | 6/2001 | Albrecht |
| 2003/0037302 A1 | 2/2003 | Dzienis |
| 2005/0273858 A1 * | 12/2005 | Zadok et al. .................... 726/24 |
| 2006/0259948 A1 | 11/2006 | Calow et al. |
| 2006/0288222 A1 * | 12/2006 | Dunkley ....................... 713/176 |
| 2006/0288416 A1 | 12/2006 | Costea et al. |

(Continued)

OTHER PUBLICATIONS

Carey Nachenberg, et al; Systems and Methods for Neutralizing File-Format-Specific Exploits Included Within Files Contained Within Electronic Communications; U.S. Appl. No. 13/418,332, filed Mar. 12, 2012.

(Continued)

*Primary Examiner* — Linglan Edwards
(74) *Attorney, Agent, or Firm* — ALG Intellectual Property, LLC

(57) ABSTRACT

A computer-implemented method for protecting document files from macro threats may include (1) identifying a document file that contains an embedded macro, (2) locating an event-driven programming language module that stores the embedded macro for the document file, and (3) cleaning the event-driven programming language module by removing procedures for the embedded macro within the event-driven programming language module and retaining variable definitions within the event-driven programming language module. Various other methods, systems, and computer-readable media are also disclosed.

20 Claims, 7 Drawing Sheets

(56) References Cited

U.S. PATENT DOCUMENTS

| | | | |
|---|---|---|---|
| 2007/0100999 | A1 | 5/2007 | Haider |
| 2009/0150419 | A1 | 6/2009 | Kim et al. |
| 2009/0187992 | A1* | 7/2009 | Poston ............................ 726/24 |
| 2010/0251000 | A1* | 9/2010 | Lyne et al. ........................ 714/2 |
| 2011/0125863 | A1 | 5/2011 | Massand |
| 2012/0005756 | A1* | 1/2012 | Hoefelmeyer et al. ......... 726/24 |
| 2012/0331517 | A1 | 12/2012 | Wilcox |
| 2013/0160127 | A1 | 6/2013 | Jeong et al. |
| 2013/0253976 | A1 | 9/2013 | Shukla et al. |

OTHER PUBLICATIONS

Ma, Jian-Yuan et al., "Suppress Malicious Scripts in Multimedia by File Format Conversion", ftp://ftp.scu.edu.tw/scu/network/tanet2011/TANet2011/%B3%CC%A8%CE%BD%D7%A4%E5/1102.pdf, as accessed on Jan. 17, 2012, Institute of Computer and Communication Engineering, Department of Electrical Engineering, National Cheng Kung University, Tainan, Taiwan.

Muir, John "No Time for Zero-Day Solutions", http://www.trustedstrategies.com/papers/white_paper_zero_day_threats.pdf, as accessed on Dec. 15, 2011, Trusted Strategies.

about.com, "GFI Offers Trojan & Executable Analyzer—Tackles fast-growing threat posed by Trojans", http://antivirus.about.com/library/weekly/aa062303a.htm, as accessed on Dec. 15, 2011.

Needham, Roger et al., "Network Attack and Defense", http://www.cl.cam.ac.uk/~rja14/Papers/SE-18.pdf, as accessed on Dec. 15, 2011, Security Engineering: A Guide to Building Dependable Distributed Systems, pp. 367-390.

The Contemplation, "Roku Channels", http://www.thecontemplation.com/index.php/2010/09/10/new-threataffecting-computersvia-email-attachment/, as accessed on Dec. 15, 2011, (May 31, 2011).

Smutz, Charles et al., "Malicious PDF Detection using Metadata and Structural Features", http://cs.gmu.edu/~astavrou/research/Malicious_PDF_Detection_ACSAC_12.pdf, as accessed Jun. 24, 2013, ACSAC '12; ACM; Orlando, Florida, (Dec. 3-7, 2012), 239-248.

Srndic, Nedim et al., "Detection of Malicious PDF Files Based on Hierarchical Document Structure", http://www.ra.cs.uni-tuebingen.de/mitarb/srndic/srndic-laskov-ndss-2013.pdf, as accessed Jun. 24, 2013, 20th Annual Network and Distributed System Security Symposium (NDSS); San Diego, California, (Feb. 24-27, 2013).

Chiron, "How to Tell if a File is Malicious", http://www.techsupportalert.com/content/how-tell-if-file-malicious.htm, as accessed Jun. 24, 2013, (Jul. 18, 2010).

Engelberth, Markus et al., "Detecting malicious documents with combined static and dynamic analysis", http://www.virusbtn.com/pdf/conference_slides/2009/Willems-VB2009.pdf, as accessed Jun. 24, 2013, Virus Bulletin 200; Pi1—Laboratory for Dependable Distributed Systems; Universitat Mannheim; Geneva, (2009).

Nguyen, Anh Quynh "Detecting malicious documentation", http://www.coseinc.com/en/index.php?rt=download&act=publication&file=D-Analyzer.pdf, as accessed Jun. 24, 2013, SyScan 2010; Ho Chi Minh City, (Sep. 23, 2010).

Digiprove, "A Novel Way of Detecting Malicious PDF Documents", http://secdiary.com/article/novel-detection-malicious-pdf-javascript/, as accessed Jun. 24, 2013, The Security Diaries, (Mar. 17, 2012).

Sandeep Bhatkar, et al; Systems and Methods for Detecting Malicious Documents Based on Component-Object Reuse; U.S. Appl. No. 14/073,815, filed Nov. 6, 2013.

Fanglu Guo, et al.; Systems and Methods for Healing Infected Document Files; U.S. Appl. No. 14/025,779; filed Sep. 12, 2013.

Jollans, Tony "Uncompressing Documents—VBA Project Storage", http://www.wordarticles.com/Articles/Formats/VBAStorage.php, as accessed Sep. 3, 2013, (Aug. 30, 2012).

Jollans, Tony "Uncompressing Documents—Old Format Documents", http://www.wordarticles.com/Articles/Formats/StructuredStorage.php, as accessed Sep. 3, 2013, (Aug. 30, 2012).

Maxey, Gregory K., "VBA Basics", http://gregmaxey.mvps.org/word_tip_pages/vba_basics.html, as accessed Sep. 3, 2013, (Jun. 10, 2013).

Microsoft Corporation, "[MS-OFCGLOS]: Microsoft Office Master Glossary", http://download.microsoft.com/download/1/6/F/16F4E321-AA6B-4FA3-8AD3-E94C895A3C97/[MS-OFCGLOS].pdf, as accessed Nov. 18, 2013.

Microsoft Corporation, "Delete a macro", http://office.microsoft.com/en-us/word-help/delete-a-macro-HA010099770.aspx, as accessed Sep. 3, 2013, (Jul. 11, 2010).

Microsoft Corporation, "Create or delete a macro", http://office.microsoft.com/en-us/excel-help/create-or-delete-a-macro-HP010342374.aspx, as accessed Sep. 3, 2013, (Jul. 3, 2010).

"How to remove macros from binary MS Office documents?", http://stackoverflow.com/questions/7298765/how-to-remove-macros-from-binary-ms-office-documents, as accessed Sep. 3, 2013, Stack Overflow, (Sep. 4, 2011).

Microsoft Corporation, "Create, run, edit, or delete a macro", http://office.microsoft.com/en-us/mac-word-help/create-run-edit-or-delete-a-macro-HA102927318.aspx, as accessed Sep. 3, 2013.

Admin, "What Is a Macro Virus and How to Remove It", http://www.combofix.org/what-is-a-macro-virus-and-how-to-remove-it.php, as accessed Sep. 3, 2013, ComboFig.org, (2008).

extendoffice.com, "How to remove macros from document in Word?", http://www.extendoffice.com/documents/word/758-word-remove-macros.html, as accessed Sep. 3, 2013, (2009).

"Advanced Persistent Threats and Other Advanced Attacks: Threat Analysis and Defense Strategies for SMB, Mid-Size, and Enterprise Organizations", http://www.websense.com/assets/white-papers/whitepaper-websense-advanced-persistent-threats-and-other-advanced-attacks-en.pdf, as accessed Jun. 24, 2013, A Websense® White Paper, (2011).

"Mitigation Guidelines for Advanced Persistent Threats", https://web.archive.org/web/20120204003219/http://www.publicsafety.gc.ca/prg/em/ccirc/2011/tr11-002-eng.aspx, as accessed Jun. 24, 2013, No. TR11-002, Public Safety Canada, (Dec. 2, 2011).

Li, Frankie "A Detailed Analysis of an Advanced Persistent Threat Malware", http://www.sans.org/reading-room/whitepapers/malicious/detailed-analysis-advanced-persistent-threat-malware-33814, as accessed Jun. 24, 2013, SANS Institute InfoSec Reading Room, (Oct. 13, 2011).

Rede, Mike "A Guide to Converters and Viewers for Email Attachments", http://www.theemailadmin.com/2009/07/a-guide-to-converters-and-viewers-for-email-attachments/, as accessed Jun. 24, 2013, TheEmailADMIN, (Jul. 29, 2009).

"Saving and Viewing E-mail Attachments in Microsoft Outlook", http://www.dummies.com/how-to/content/saving-and-viewing-email-attachments-in-microsoft-outlook.html, as accessed Jun. 24, 2013, (Aug. 8, 2010).

"Attachments: View, download, and save", https://support.google.com/mail/answer/30719?hl=en, as accessed Jun. 24, 2013, Google, (Apr. 12, 2013).

"Solid Documents Releases Solid Converter® 7.3", http://www.soliddocuments.com/pdf/_solid_converter_v7_3/312/1, as accessed Jun. 24, 2013, Nelson, New Zealand, (Oct. 1, 2012).

"Frank Boldewin's www.reconstructer.org", http://www.reconstructer.org/code.html, as accessed Jun. 24, 2013, (Feb. 5, 2007).

"R-Tools Technology", http://www.r-tt.com/word_recovery/, as accessed Jun. 24, 2013, (2000).

"The Undelete Company", http://the-undelete.com/promo.php, as accessed Jun. 24, 2013, (Jul. 17, 2012).

"The Symantec Brightmail Gateway Appliance quarantines Microsoft Office 2007 documents under the Executable File rule", http://www.symantec.com/business/support/index?page=content&id=TECH86094, as accessed Jun. 24, 2013, Article:TECH86094, Symantec Corporation, (Jan. 26, 2007).

Sanjaykumarm, "Extracting embedded spreadsheets from wordprocessingML documents", http://openxmldeveloper.org/blog/b/openxmldeveloper/archive/2007/05/10/1543.aspx, as accessed Jun. 24, 2013, (May 10, 2007).

"Remove hidden data and personal information from Office documents", https://support.office.com/en-us/article/Remove-hidden-

(56) References Cited

OTHER PUBLICATIONS data-and-personal-information-from-Office-documents-c2499d69-413c-469b-ace3-cf7e31a85953?ui=en-US&rs=en-US&ad=US, as accessed Jun. 24, 2013, Microsoft, (On or before Jun. 24, 2013).

"Add or remove a digital signature in Office documents", https://support.office.com/en-us/article/Add-or-remove-a-digital-signature-in-Office-documents-49af4304-bfe7-41bf-99c3-a5023bdab44a?ui=en-US&rs=en-US&ad=US, as accessed Jun. 24, 2013, Microsoft, (On or before Jun. 24, 2013).

"Create, change, or delete an OLE object", https://support.office.com/en-us/article/Create-change-or-delete-an-OLE-object-f767f0f1-4170-4850-9b96-0b6c07ec6ea4?ui=en-US&rs=en-US&ad=US, as accessed Jun. 24, 2013, Microsoft, (On or before Jun. 24, 2013).

"Remove background colors, images, or text from a document", http://office.microsoft.com/en-gb/word-help/remove-background-colors-images-or-text-from-a-document-HP005189623.aspx, as accessed Jun. 24, 2013, Microsoft, (Sep. 24, 2011).

"Deployment of the Microsoft Windows Malicious Software Removal Tool in an enterprise environment", http://support.microsoft.com/kb/891716, as accessed Jun. 24, 2013, Article ID: 891716, Microsoft, (Jan. 13, 2005).

Zeltser, Lenny "Analyzing Malicious Documents Cheat Sheet", http://zeltser.com/reverse-malware/analyzing-malicious-documents.html, as accessed Jun. 24, 2013, (1995).

"Safety 101: PC Safety", http://support.kaspersky.com/viruses/disinfection/5350?el=88446, as accessed Jun. 24 2013, Kaspersky Lab, (1997).

\* cited by examiner

Event-Driven Programming Language Module
502

Variable Declarations
504

Attribute VB_Control = "ShockwaveFlash1, 3, 0, ShockwaveFlashObjects, ShockwaveFlash"

Procedures
506

```
Sub SubExample()
  'The instructions
  'On Error GoTo Err_Hanlder
  With Selection.Font
    'Set font color property
    .Color = wdColorRed
    'Set font size property
    .Size = 14
  End With
  'The Exit statement
  Exit Sub
Err_Handler:
'The End statement
End Sub
```

*FIG. 5*

SYSTEMS AND METHODS FOR PROTECTING DOCUMENT FILES FROM MACRO THREATS

CROSS REFERENCES TO RELATED APPLICATIONS

This application claims the benefit of U.S. Provisional Application No. 61/839,363, titled "DISARMING EXPLOITS BY RECONSTRUCTING FILES," filed 25 Jun. 2013, the disclosure of which is incorporated, in its entirety, by this reference. This application also incorporates in its entirety U.S. application Ser. No. 14/025,779, titled "SYSTEMS AND METHODS FOR HEALING INFECTED DOCUMENT FILES," which was filed 12 Sep. 2013 and also claims priority to U.S. Provisional Application No. 61/839,363.

BACKGROUND

Email is now a ubiquitous form of communication. To transmit files between persons and organizations, email may also include the files as attachments. Unfortunately, email attachments may contain payloads from attackers intending to compromise computer security.

As one example, document files may include macros that host a shellcode, which is a payload used in the exploitation of a software vulnerability. Attackers may encrypt the shellcode to prevent static scanning-based detection. When executed, the macro may automatically decrypt the shellcode and trigger a memory error to gain control over a document application (e.g., a word processing or spreadsheet application). To bypass address space layout randomization defenses, the attackers may use a heap spraying technique that fills large parts of memory with NOP ("No Operation") commands and shellcode. After extracting shellcode into memory, macros can also trigger a bug that corrupts a code pointer value. If the pointer points to the shellcode part of memory, then the attack may succeed.

Accordingly, the instant disclosure identifies and addresses a need for additional and improved systems and methods for protecting document files from macro threats.

SUMMARY

As will be described in greater detail below, the instant disclosure generally relates to systems and methods for protecting document files from macro threats by identifying a document that contains a macro, locating a software module that stores the macro for the document, and cleaning the software module by removing procedures from the software module. In one specific example, a computer-implemented method for protecting document files from macro threats may include (1) identifying a document file that contains an embedded macro, (2) locating an event-driven programming language module that stores the embedded macro for the document file, and (3) cleaning the event-driven programming language module by removing procedures for the embedded macro within the event-driven programming language module and retaining variable definitions within the event-driven programming language module.

In one embodiment, the document file may be formatted based on a compound file binary format. The document file may include at least one of a word processing document and a spreadsheet document. The event-driven programming language module may include a sub-tree of a main compound file binary format tree.

In some embodiments, the document file may include a presentation program document. The event-driven programming language module may be stored in an event-driven programming language project storage record within a presentation program stream.

In one embodiment, the document file may be formatted based on an open extensible markup language format. The event-driven programming language module may be stored in a compound file binary format file. A relationship file may identify a relationship between the event-driven programming language module and the compound file binary format file.

In some examples, cleaning the event-driven programming language module may include identifying a directory stream within an event-driven programming language storage of the event-driven programming language module. Cleaning the event-driven programming language module may include decompressing the directory stream. Cleaning the event-driven programming language module may also include parsing the directory stream to locate a plurality of module streams identified by the directory stream.

In some embodiments, cleaning the event-driven programming language module may include, for each of the plurality of module streams: (1) decompressing event-driven programming language code of the module stream, (2) modifying code lines by removing code lines that contain procedure definitions, (3) compressing the modified code lines, and (4) storing the compressed modified code lines in the module stream.

In some examples, cleaning the event-driven programming language module may include deleting a performance cache shadow data structure that includes an array of bytes that forms an implementation-specific and version-dependent performance cache for a project containing the event-driven programming language module.

In one embodiment, a system for implementing the above-described method may include (1) an identification module, stored in memory, that identifies a document file that contains an embedded macro, (2) a location module, stored in memory, that locates an event-driven programming language module that stores the embedded macro for the document file, (3) a cleaning module, stored in memory, that cleans the event-driven programming language module by removing procedures for the embedded macro within the event-driven programming language module and retaining variable definitions within the event-driven programming language module, and (4) at least one processor configured to execute the identification module, the location module, and the cleaning module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a document file that contains an embedded macro, (2) locate an event-driven programming language module that stores the embedded macro for the document file, and (3) clean the event-driven programming language module by removing procedures for the embedded macro within the event-driven programming language module and retaining variable definitions within the event-driven programming language module.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a block diagram of an exemplary macro analyzed by a system for protecting document files from macro threats.

Figure 1:
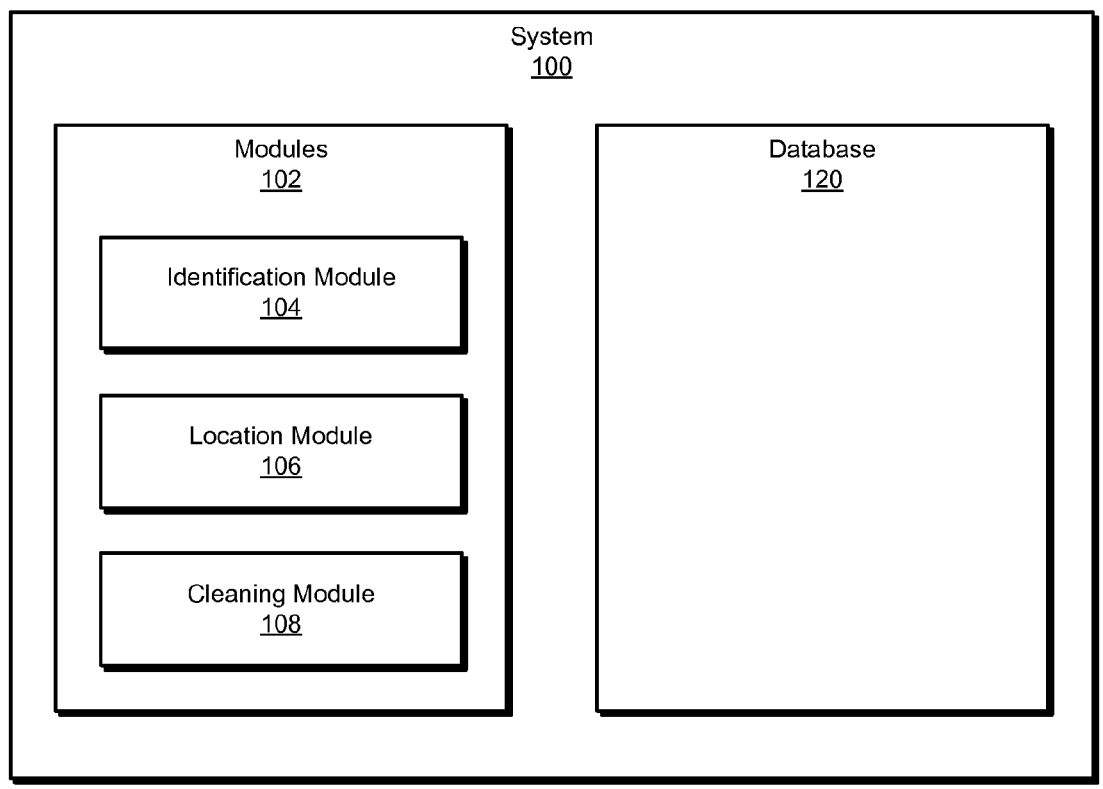
FIG. 1 is a block diagram of an exemplary system for protecting document files from macro threats.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for protecting document files from macro threats. As will be explained in greater detail below, the systems and methods described herein may resolve, delete, and/or render harmless macros, including macro exploits or malware. The systems and methods may also autonomously resolve macros in document files in a repeated or batch manner, with little or no user intervention. Moreover, the systems and methods may also resolve macros without compromising other functionality of the document file, such as ACTIVEX functionality, as discussed further below.

Figure 2:
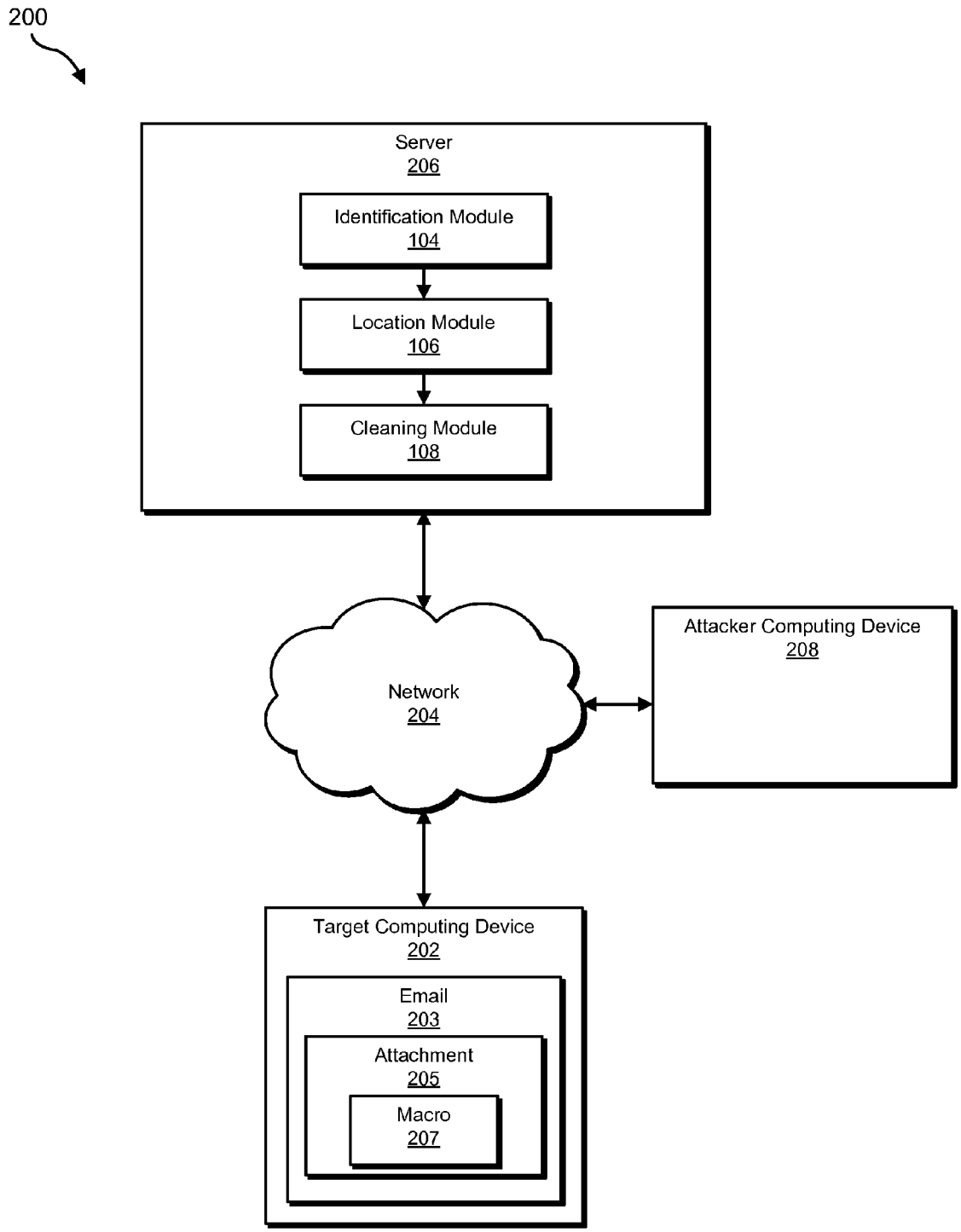
FIG. 2 is a block diagram of an exemplary system for protecting document files from macro threats.

The following will provide, with reference to FIGS. 1-2, detailed descriptions of exemplary systems for protecting document files from macro threats. Detailed descriptions of corresponding computer-implemented methods will also be provided in connection with FIG. 3. Moreover, detailed description of a corresponding document file will be provided in connection with FIG. 4. Similarly, detailed descriptions of a corresponding macro will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for protecting document files from macro threats. As illustrated in this figure, exemplary system 100 may include one or more modules 102 for performing one or more tasks. For example, and as will be explained in greater detail below, exemplary system 100 may include an identification module 104 that may identify a document file that contains an embedded macro. Exemplary system 100 may additionally include a location module 106 that may locate an event-driven programming language module that stores the embedded macro for the document file. Exemplary system 100 may also include a cleaning module 108 that may clean the event-driven programming language module by removing procedures for the embedded macro within the event-driven programming language module and retaining variable definitions within the event-driven programming language module. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store emails, email attachments, including document files, and information about macro and other malware threats.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device, such as target computing device 202 and attacker computing device 208, in communication with a server 206 via a network 204. Computing device 202 may be programmed with one or more of modules 102 and/or may store all or a portion of the data in database 120. Additionally or alternatively, server 206 may be programmed with one or more of modules 102 and/or may store all or a portion of the data in database 120.

In the example of FIG. 2, attacker computing device 208 may originally create or intercept and modify an email 203. Attacker computing device 208 may modify an attachment 205 to email 203 so that attachment 205 includes a macro 207. Attacker computing device 208 may then transmit email 203 to target computing device 202 where a potential victim receives email. At target computing device 202, or at server 206 prior to reception at target computing device 202, one or more modules 102 may perform steps to resolve the macro, as discussed further below. Server 206, as a mail server, may receive email 203 through routine email transmission. Alternatively, server 206, as a security server, may intercept and/or monitor routine email transmissions to provide protection from macros. Server 206 may also respond to queries from target computing device 202, and thereby clean document files or provide other protection on demand.

In one embodiment, one or more of modules 102 from FIG. 1 may, when executed by at least one processor of computing device 202 and/or server 206, enable computing device 202 and/or server 206 protect document files from macro threats. For example, and as will be described in greater detail below, one or more of modules 102 may cause computing device 202 and/or server 206 to protect document files from macro threats. For example, identification module 104 may be programmed to identify a document file, such as attachment 205 (e.g., a MICROSOFT WORD document) that contains an embedded macro, such as macro 207. Location module 106 may be programmed to locate an event-driven programming language module that stores macro 207 for attachment 205. Cleaning module 108 may be programmed to clean the event-driven programming language module by removing procedures for macro 207 within the event-driven programming language module and retaining variable definitions within the event-driven programming language module.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of processing emails and/or providing protection from macro threats. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
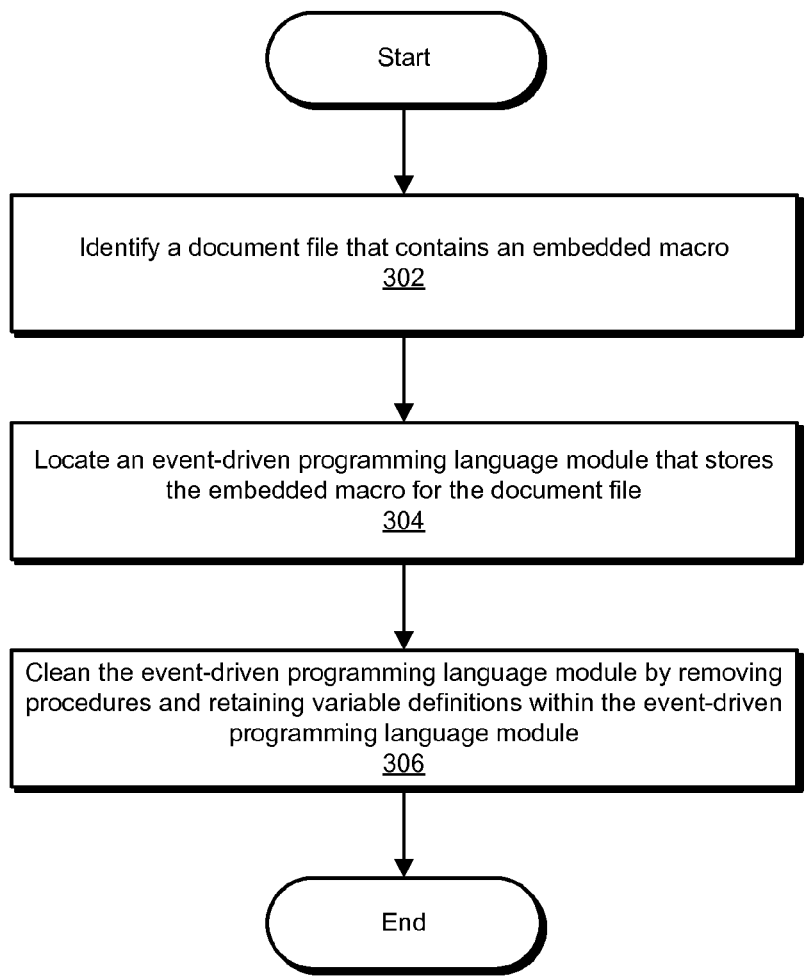
FIG. 3 is a flow diagram of an exemplary method for protecting document files from macro threats.

FIG. 3 is a flow diagram of an exemplary computer-implemented method 300 for protecting document files from macro threats. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a document file that contains an embedded macro. For example, at step 302 identification module 104 may, as part of computing device 202 in FIG. 2, identify a document file as attachment 205 that contains macro 207.

As used herein, the phrase "document file" generally refers to any file storing at least some information for presenting a page, slide, and/or sheet to a user, typically including at least some text. Exemplary kinds of document files include word processing document files, spreadsheet document files, and presentation application (e.g., POWERPOINT) document files. Moreover, as used herein, the phrase "macro" generally refers to one or more executable or procedure commands that may be embedded within a document file.

Identification module 104 may identify the document file in a variety of ways. Identification module 104 may receive a selection of the document file (e.g., from a user). Identification module 104 may receive a request to process or clean the document file. Similarly, identification module 104 may receive an identification of the document file in a list or series of files to be processed (e.g., in a batch manner). Identification module may also identify the document file as a document file based on a name, file extension, tag, metadata, and/or a content/body of the file. Identification module 104 may further identify the document file based on the behavior of other modules or applications with respect to the file.

In one embodiment, the document file is formatted based on a compound file binary format. As used herein, the phrase "compound file binary ('CFB') format" generally refers to a format of binary file configured for storing multiple files within a single larger file as a collection. The compound file binary format file may correspond to a MICROSOFT OFFICE document prior to the 2007 switch to OPEN EXTENDED MARKUP LANGUAGE ("OXML") format. In some embodiments, the document file may include a word processing document (e.g., MICROSOFT WORD) and/or a spreadsheet document (e.g., MICROSOFT EXCEL). In further embodiments, the document file may include a presentation program (e.g., MICROSOFT POWERPOINT) document.

In one embodiment, the document file is formatted based on an open extensible markup language format. As used herein, the phrase "extensible markup language ('XML') format" refers to the standardized markup language that defines a set of rules for encoding documents in a format that is both human-readable and machine-readable. The phrase "open extensible markup language format" may refer to MICROSOFT'S modified version of XML used in the 2007 MICROSOFT OFFICE switch from the compound file binary format, as discussed above.

At step 304 one or more of the systems described herein may locate an event-driven programming language module that stores the embedded macro for the document file. For example, at step 304 location module 106 may, as part of computing device 202 in FIG. 2, locate an event-driven programming language module that stores macro 207 for attachment 205.

As used herein, the phrase "event-driven programming language" generally refers to a programming language in which the flow of a program is determined by events such as sensor outputs or user actions (e.g., mouse clicks, key presses) or messages from other programs or threads. In a primary embodiment, one example of an event-driven programming languages is MICROSOFT'S VISUAL BASIC FOR APPLICATIONS ("VBA"), which may embed macros within MICROSOFT OFFICE document files, as discussed above. Notably, a VBA module generally refers to a collection of routines and/or data structures that perform a specific task or implements a specific abstract data type. VBA modules typically include two parts, a module header and a module body. A module header may include a set of name/value attribute pairs that specify the linguistic characteristics of the module. A module body may include VBA source code, which may include a set of declarations followed by procedures. VBA supports two types of modules, procedural modules and class modules.

Figure 4:
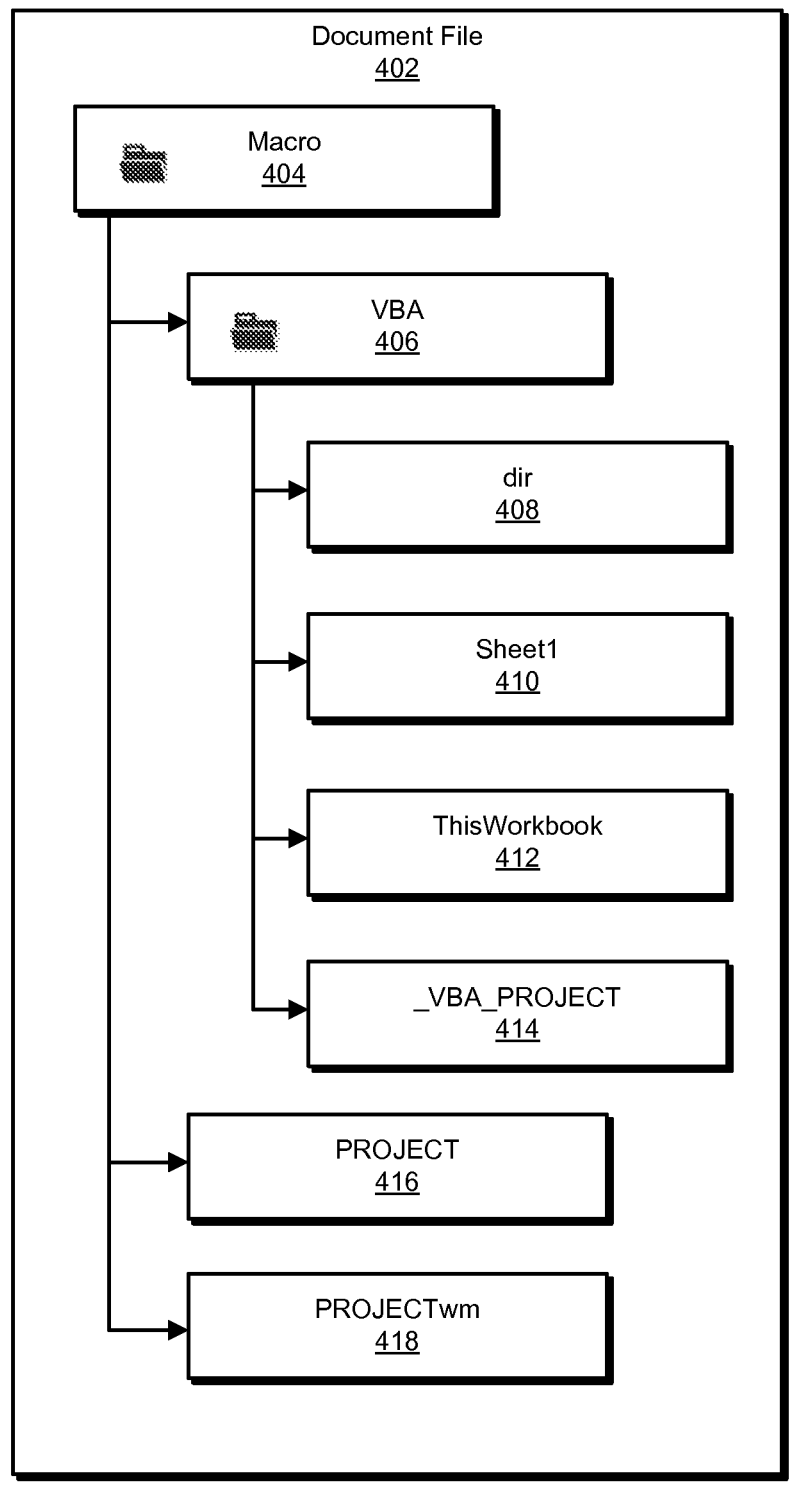
FIG. 4 is a block diagram of an exemplary document file analyzed by a system for protecting document files from macro threats.

FIG. 4 shows an exemplary document file 402 that may be analyzed by the systems and methods described herein. With reference to FIG. 4, an overview follows for how location module 106 may locate the event-driven programming language module in a variety of ways. FIG. 4 shows how macros may be stored in MICROSOFT WORD document files in either CFB format or OXML format. In either case, the event-driven programming language module may include macro 404, which may correspond to a VIRTUAL BASIC FOR APPLICATIONS 'storage.' In VBA, 'storages' may be analogous to directories or folders in conventional file systems. Macro 404 may further store VBA 406, which is another storage. As further shown in FIG. 4, document file 402 may also include dir 408, Sheet1 410, ThisWorkbook 412, _VBA_PROJECT 414, PROJECT 416, and PROJECTwm 418, which are all "streams." In VBA, "streams" are analogous to files in conventional file systems.

As used herein, the phrase "event-driven programming language module" may refer to at least a "storage" or folder, such as macro 404 in FIG. 4, and/or a "stream" or file, such as Sheet1 410 in FIG. 4 (in the example of a spreadsheet). More generally, the phrase "event-driven programming language module" may refer to a logically separated unit of programming language content, such as a separate folder, file, library, and/or section of code.

In the case of document file 402 being formatted based on CFB format, the event-driven programming language module macro 404 may correspond to a sub-tree of a main compound file binary format tree. Location module 106 may locate the event-driven programming language module in part by locating the sub-tree of the main compound file binary format tree. Moreover, in the case of document file 402 corresponding to a presentation program (e.g., POWERPOINT), the event-driven programming language module may be stored in an event-driven programming language project storage record within a presentation program stream. Specifically, the event-driven programming language module may be stored within a "VbaProjectStg" record within a "PowerPoint Document" stream.

In contrast to document file 402 being stored in CFB format, in the case of OXML format, the event-driven programming language module may be stored in a compound file binary format file (i.e., a CFB file embedded within the OXML document file). A relationship file may identify a relationship between the event-driven programming language module and the compound file binary format file. For example, a relationship file may include the following relationship: <Relationship Id="rld1" Type="http://schemas.microsoft.com/office/2006/relationships/vbaProject" Target="vbaProject.bin"/>. Location module 106 may locate the event-driven programming language module in part by locating the relationship file and/or using the relationship file to locate the binary file that stores the macro.

At step 306 one or more of the systems described herein may clean the event-driven programming language module by removing procedures for the embedded macro within the event-driven programming language module and retaining variable definitions within the event-driven programming language module. For example, at step 306 cleaning module 108 may, as part of computing device 202 in FIG. 2, clean the event-driven programming language module by removing procedures for macro 207 within the event-driven programming language module and retaining variable definitions within the event-driven programming language module. As used herein, the phrase "procedures" generally refers to executable code within the event-driven programming language, as distinct from variable declarations and definitions, which establish the name and type of variables, and may not be included within procedures. In VBA, variable declarations may precede procedures in module streams. Cleaning module 108 may remove a single, or plural, procedures, and may retain a single, or plural, variable definition, as further discussed below.

Cleaning module 108 may clean the event-driven programming language module in a variety of ways. In some examples, cleaning module 108 may clean the event-driven programming language module in part by identifying a directory stream within an event-driven programming language storage of the event-driven programming language module. The directory stream may correspond to dir stream 408 in FIG. 4. Dir stream 408 may constitute a special stream that contains information about other streams within document file 402.

In some examples, cleaning module 108 may clean the event-driven programming language module in part by decompressing the directory stream. Moreover, cleaning module 108 may also clean the event-driven programming language module in part by parsing the directory stream to locate a plurality of module streams identified by the directory stream. In the example of FIG. 4, cleaning module 108 may parse dir 408 to identify other streams, such as Sheet1 410 and PROJECT 416. In some embodiments, cleaning module 108 may clean the event-driven programming language module in part by performing the following for one, some, and/or each of the plurality of module streams: (1) decompressing event-driven programming language code of the module stream, (2) modifying code lines by removing code lines that contain procedure definitions, (3) compressing the modified code lines, and (4) storing the compressed modified code lines in the module stream.

FIG. 5 shows an exemplary event-driven programming language module 502 (e.g., a decompressed VBA stream) that may be analyzed by the systems and methods described herein. Cleaning module 108 may clean module 502 in part by deleting procedures 506, which may be identified in any of the ways described above, while retaining variable declarations 504. Notably, in the example of FIG. 5, procedures 506 correspond to an innocuous macro instead of a malicious macro exploit. The systems and methods described herein may remove procedures for some (e.g., one or more), all, or substantially all macros without verifying that the macros correspond to an exploit.

More generally, cleaning module 108 may clean the event-driven programming language module on a line by line or section by section basis. For each line (or section) in a plurality of lines (or sections), cleaning module 108 may categorize the line as corresponding to a procedure definition or as not corresponding to a procedure definition. If the line corresponds to a procedure definition, cleaning module 108 may remove, render blank, render function-less, and/or comment out the line. Cleaning module 108 may identify lines corresponding to procedure definitions as distinct from variable declarations that do constitute (part of) a procedure definition. Cleaning module 108 may leave variable declarations. Moreover, cleaning module 108 may categorize lines, parts, and/or sections of the event-driven programming language module as constituting or corresponding to procedure and/or variable declarations based on one or more factors. These factors may include a procedure keyword (e.g., in VBA, these may include "Function," "Sub," "Operator," "Get," "Set," and a matching "End" keyword), a variable declaration keyword (e.g., in VBA, these may include "Attribute"), and/or a relative or absolute position of the part of the event-driven programming language module (e.g., variable declarations may be more likely to be located at the start of the module, and procedure lines may be contained within other lines marked by procedure keywords, such as "Sub" and "End").

Cleaning module 108 may similarly remove some, all, or substantially all lines, parts, and/or sections categorized as procedure definitions. Cleaning module 108 may perform this cleaning for some, all, and/or substantially all streams identified by Dir 408, and/or those streams selected or defined by a user (e.g., upon a prompt displaying various candidate streams for cleaning), and/or those streams designated by a security program. Moreover, in order to preserve functionality of a document component other than macro 207, cleaning module 108 may identify specific variable declarations based on specific keywords such as "ACTIVEX," "VB_Control," "Shockwave," "ShockwaveFlash," "ShockwaveFlash1," and/or "ShockwaveFlashObjects." In some embodiments, cleaning module may retain those declarations while deleting, removing, and/or rendering functionless others.

Moreover, in some examples, cleaning module 108 may clean the event-driven programming language module in part by deleting a performance cache shadow data structure that includes an array of bytes that forms an implementation-specific and version-dependent performance cache for a project containing the event-driven programming language module. The shadow data structure may have the specific name "PerformanceCache." Cleaning module 108 may delete PerformanceCache from all streams within document file 402 that contain the shadow data structure. These streams may include _VBA_PROJECT 414, all _SRP_Streams (not shown in the example of FIG. 4), and all other module streams.

As explained above in connection with method 300 in FIG. 3, the systems and methods described herein may resolve, delete, and/or render harmless macros, including macro exploits or malware. The systems and methods may also autonomously resolve macros in document files in a repeated or batch manner, with little or no user intervention. Moreover, the systems and methods may also resolve macros without compromising other functionality of the document file, such as ACTIVEX functionality, as discussed further above.

The above discussion of FIG. 3 provided specific details about the systems and methods described herein. The following provides a higher level overview of these systems and methods.

Cleaning module 108 may delete macro 207 completely by removing the VBA storage object in OFFICE 2003 format, and by removing VBA binary files and their corresponding relationships in OFFICE 2007 format files. However, that deletion affects the functionality of ACTIVEX objects that store properties in VBA code. For instance, the deletion may cause an embedded FLASH video to stop playing. The loss of functionality (e.g., the FLASH video stopped playing) may be particularly undesirable for security programs that enable the selective deletion of macros. To address this problem, cleaning module 108 may specifically refrain from deleting the event-driven programming language module completely. Instead, cleaning module 108 may only remove procedures because the procedures could contain exploit code. In contrast, cleaning module 108 may specifically retain all variable definitions within the event-driven programming language module, because the variable definitions could include ACTIVEX property definitions.

Cleaning module 108 may perform the following specific steps to clean the event-driven programming language module. First, cleaning module 108 may identify the "dir" stream within the "VBA" storage (e.g., folder). The "dir" stream is stored in compressed format. Therefore, cleaning module 108 may decompress the "dir" stream. Cleaning module 108 may then parse the "dir" stream to find all of the module streams. Each entry in the "dir" stream contains information such as the name of a stream that stores VBA code and the offset of the VBA code within the stream.

For each of the module streams with VBA code, cleaning module 108 may modify the module stream as follows. VBA code may be stored in a compressed form between a text offset and the end of the module stream. Cleaning module 108 may decompress the code, remove the code lines that contain procedure definitions, compress the code, and finally put the modified, compressed code back in the module stream.

Unfortunately, all the versions of MICROSOFT OFFICE applications (e.g., WORD, XLS, PPT) loosely interpret the VBA format specification. The applications use a version specific undocumented shadow data structure called PerformanceCache to store metadata as well as VBA code. The version field in the _VBA_PROJECT stream specifies the version of VBA used to create a VBA project. According to the specification, the version value should be 0xFFFF on write, indicating that the main data structure be used for interpretation. Unfortunately, the applications write a VBA specific version in the field, causing the shadow data structure to be used. Explicitly changing the version value to 0xFFFF does not necessarily force the applications to use the main data structure. Therefore, deletion of VBA procedures may not fully work, in some cases, without the following additional step. To address MICROSOFT'S loose interpretation of the format specification, cleaning module 108 may explicitly delete PerformanceCache from all the streams that include PerformanceCache, specifically _VBA_PROJECT, all _SRP_Streams, and the module streams. With this change, the deletion of VBA macros can be selectively applied.

Figure 6:
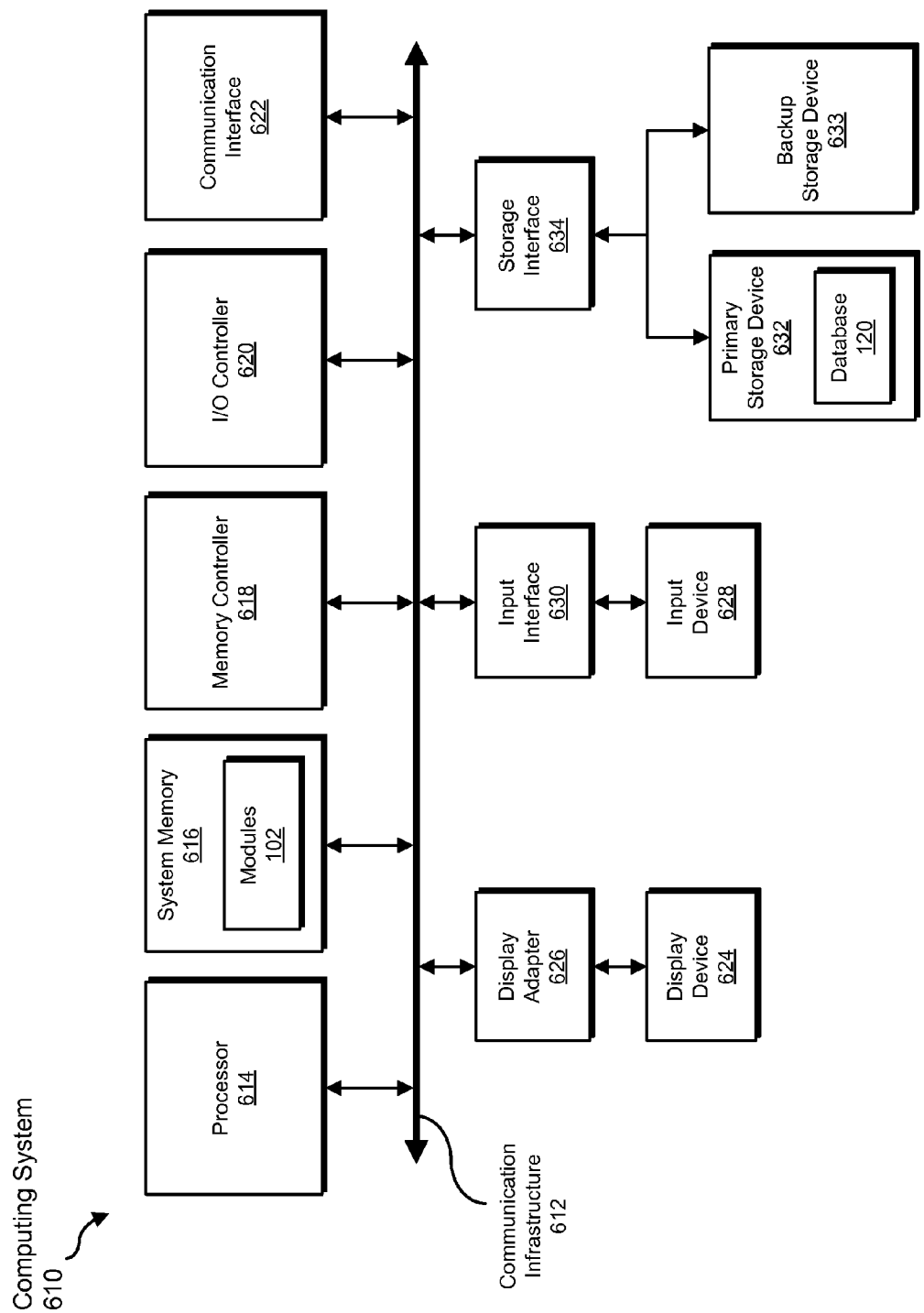
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs)), and BLU-RAY disks, electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
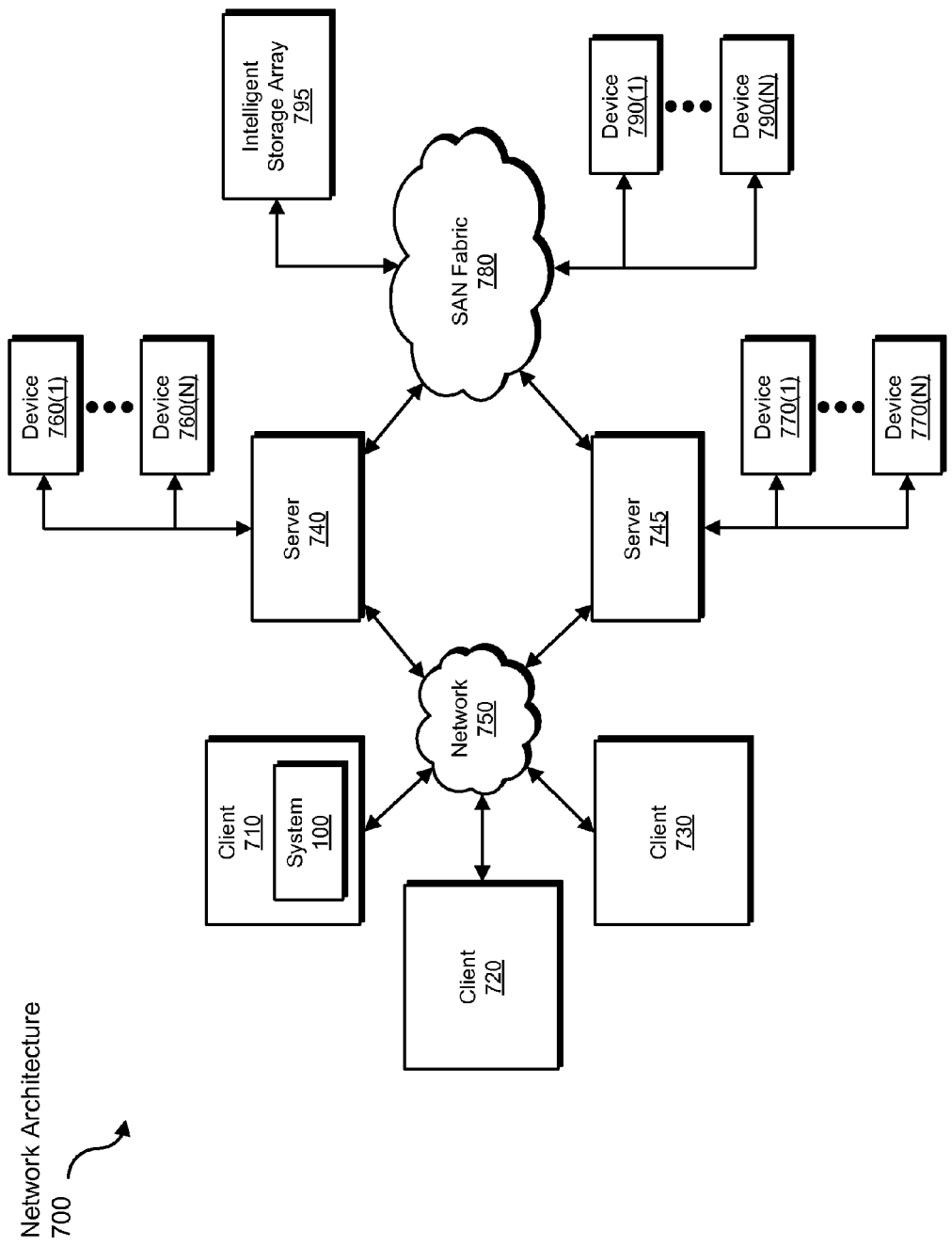
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for protecting document files from macro threats.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a document file to be transformed, transform the document file by cleaning the document file of one or more macros or macro procedures, output a result of the transformation to destination computing device or recipient email inbox, use the result of the transformation to protect users from macro exploits, and store the result of the transformation to a destination computing device, mail server, and/or recipient computer. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the phrases "connected to" and "coupled to" (and their derivatives), as used in the specification and claims, are to be construed as permitting both direct and indirect (i.e., via other elements or components) connection. In addition, the phrases "a" or "an," as used in the specification and claims, are to be construed as meaning "at least one of." Finally, for ease of use, the words "including" and "having," as used in the specification and claims, are interchangeable with and have the same meaning as the word "comprising."

What is claimed is:

1. A computer-implemented method for protecting document files from macro threats, at least a portion of the method being performed by a computing device comprising at least one processor, the method comprising:
   identifying a document file that contains an embedded macro;
   locating an event-driven programming language module that stores the embedded macro for the document file;
   cleaning the event-driven programming language module by:
      categorizing a portion of the event-driven programming language module as constituting a procedure;
      categorizing another portion of the event-driven programming language module as constituting a variable definition as distinct from the procedure;
      selectively editing the embedded macro within the event-driven programming language module by performing at least one of removing and cleaning the portion of the event-driven programming language module categorized as the procedure while retaining, within the event-driven programming language module, the other portion of the event-driven programming language module categorized as the variable definition as distinct from the procedure.

2. The method of claim 1, wherein the document file is formatted based on a compound file binary format.

3. The method of claim 2, wherein:
   the document file comprises at least one of a word processing document and a spreadsheet document;
   the event-driven programming language module comprises a sub-tree of a main compound file binary format tree.

4. The method of claim 2, wherein:
   the document file comprises a presentation program document;
   the event-driven programming language module is stored in an event-driven programming language project storage record within a presentation program stream.

5. The method of claim 1, wherein the document file is formatted based on an open extensible markup language format.

6. The method of claim 5, wherein:
   the event-driven programming language module is stored in a compound file binary format file;
   a relationship file identifies a relationship between the event-driven programming language module and the compound file binary format file.

7. The method of claim 1, wherein cleaning the event-driven programming language module comprises identifying a directory stream within an event-driven programming language storage of the event-driven programming language module.

8. The method of claim 7, wherein cleaning the event-driven programming language module comprises:
   decompressing the directory stream;
   parsing the directory stream to locate a plurality of module streams identified by the directory stream.

9. The method of claim 8, wherein cleaning the event-driven programming language module comprises, for each of the plurality of module streams:
   decompressing event-driven programming language code of the module stream;
   modifying code lines by removing code lines that contain procedure definitions;
   compressing the modified code lines;
   storing the compressed modified code lines in the module stream.

10. The method of claim 1, wherein cleaning the event-driven programming language module comprises deleting a performance cache shadow data structure comprising an array of bytes that forms an implementation-specific and version-dependent performance cache for a project containing the event-driven programming language module.

11. A system for protecting document files from macro threats, the system comprising:
   an identification module, stored in memory, that identifies a document file that contains an embedded macro;
   a location module, stored in memory, that locates an event-driven programming language module that stores the embedded macro for the document file;
   a cleaning module, stored in memory, that cleans the event-driven programming language module by:
      categorizing a portion of the event-driven programming language module as constituting a procedure;
      categorizing another portion of the event-driven programming language module as constituting a variable definition as distinct from the procedure;
      selectively editing the embedded macro within the event-driven programming language module by performing at least one of removing and cleaning the portion of the event-driven programming language module categorized as the procedure while retaining, within the event-driven programming language module, the other portion of the event-driven programming language module categorized as the variable definition as distinct from the procedure;
   at least one processor configured to execute the identification module, the location module, and the cleaning module.

12. The system of claim 11, wherein the document file is formatted based on a compound file binary format.

13. The system of claim 12, wherein:
   the document file comprises at least one of a word processing document and a spreadsheet document;
   the event-driven programming language module comprises a sub-tree of a main compound file binary format tree.

14. The system of claim 12, wherein:
   the document file comprises a presentation program document;
   the event-driven programming language module is stored in an event-driven programming language project storage record within a presentation program stream.

15. The system of claim 11, wherein the document file is formatted based on an open extensible markup language format.

16. The system of claim 15, wherein:
the event-driven programming language module is stored in a compound file binary format file;
a relationship file identifies a relationship between the event-driven programming language module and the compound file binary format file.

17. The system of claim 11, wherein the cleaning module cleans the event-driven programming language module by identifying a directory stream within an event-driven programming language storage of the event-driven programming language module.

18. The system of claim 17, wherein the cleaning module cleans the event-driven programming language module at least in part by:
decompressing the directory stream;
parsing the directory stream to locate a plurality of module streams identified by the directory stream.

19. The system of claim 18, wherein the cleaning module cleans the event-driven programming language module, for each of the plurality of module streams, at least in part by:
decompressing event-driven programming language code of the module stream;
modifying code lines by removing code lines that contain procedure definitions;
compressing the modified code lines;
storing the compressed modified code lines in the module stream.

20. A non-transitory computer-readable-storage medium comprising one or more computer-readable instructions that, when executed by at least one processor of a computing device, cause the computing device to:
identify a document file that contains an embedded macro;
locate an event-driven programming language module that stores the embedded macro for the document file;
clean the event-driven programming language module by:
categorizing a portion of the event-driven programming language module as constituting a procedure;
categorizing another portion of the event-driven programming language module as constituting a variable definition as distinct from the procedure;
selectively editing the embedded macro within the event-driven programming language module by performing at least one of removing and cleaning the portion of the event-driven programming language module categorized as the procedure while retaining, within the event-driven programming language module, the other portion of the event-driven programming language module categorized as the variable definition as distinct from the procedure.

* * * * *